US012545027B2

(12) United States Patent
Yamagishi

(10) Patent No.: US 12,545,027 B2
(45) Date of Patent: Feb. 10, 2026

(54) LIQUID EJECTION APPARATUS

(71) Applicant: SEIKO EPSON CORPORATION, Tokyo (JP)

(72) Inventor: Akira Yamagishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

(21) Appl. No.: 18/464,707

(22) Filed: Sep. 11, 2023

(65) Prior Publication Data

US 2024/0083169 A1 Mar. 14, 2024

(30) Foreign Application Priority Data

Sep. 13, 2022 (JP) ................................ 2022-145092

(51) Int. Cl.
*B41J 2/165* (2006.01)

(52) U.S. Cl.
CPC ................................ *B41J 2/16508* (2013.01)

(58) Field of Classification Search
CPC .................. B41J 2/16508; B41J 25/304; B41J 2002/16591; B41J 2/16585
See application file for complete search history.

(56) References Cited

U.S. PATENT DOCUMENTS

| | | | | |
|---|---|---|---|---|
| 5,682,186 A * | 10/1997 | Bohorquez | ............ | B41J 2/1754 347/29 |
| 2018/0215155 A1* | 8/2018 | Iida | ...................... | B41J 2/16505 |
| 2022/0097385 A1* | 3/2022 | Shimomura | ......... | B41J 2/16508 |

FOREIGN PATENT DOCUMENTS

| | | |
|---|---|---|
| JP | 2022-055503 A | 4/2022 |

* cited by examiner

*Primary Examiner* — Shelby L Fidler
*Assistant Examiner* — Tracey M McMillion
(74) *Attorney, Agent, or Firm* — WORKMAN NYDEGGER

(57) ABSTRACT

A liquid ejection apparatus includes an ejection portion including a nozzle surface at which one or more nozzles open, and configured to eject, from the nozzle, liquid in a direction different from a vertical direction, a cap configured to form a space in communication with the nozzle by making contact with the ejection portion, an mounting portion to which the cap is detachably mounted, and a holding portion configured to hold the cap detached from the mounting portion. The cap includes a grabbing portion configured to be grabbed by an operator, and a contact portion configured to be hooked onto the holding portion.

12 Claims, 11 Drawing Sheets

LIQUID EJECTION APPARATUS

The present application is based on, and claims priority from JP Application Serial Number 2022-145092, filed Sep. 13, 2022, the disclosure of which is hereby incorporated by reference herein in its entirety.

BACKGROUND

1. Technical Field

The present disclosure relates to a liquid ejection apparatus.

2. Related Art

JP-A-2022-55503 discloses a liquid ejection apparatus including an ejection portion that ejects liquid and a cap that can make contact with the ejection portion. The cap is configured to be replaceable.

In such a liquid ejection apparatus, the liquid ejected from the ejection portion is received by the cap in some situation. As such, there is a risk of liquid spillage from the cap if the posture of the cap is tilted during the replacement of the cap.

SUMMARY

A liquid ejection apparatus for solving the above-described problems includes an ejection portion including a nozzle surface at which one or more nozzles open, and configured to eject, from the nozzle, liquid in a direction different from a vertical direction, a cap configured to form a space in communication with the nozzle by making contact with the ejection portion, a mounting portion to which the cap is detachably mounted, and a holding portion configured to hold the cap detached from the mounting portion. The cap includes a grabbing portion configured to be grabbed by an operator, and a contact portion configured to be hooked onto the holding portion.

DESCRIPTION OF EMBODIMENTS

An example of a liquid ejection apparatus is described below with reference to the drawings. The liquid ejection apparatus is an ink-jet printer that records an image such as letters and a photograph by ejecting an ink, which is an example of liquid, on a medium such as a sheet and fabric.

Liquid Ejection Apparatus

Figure 1:
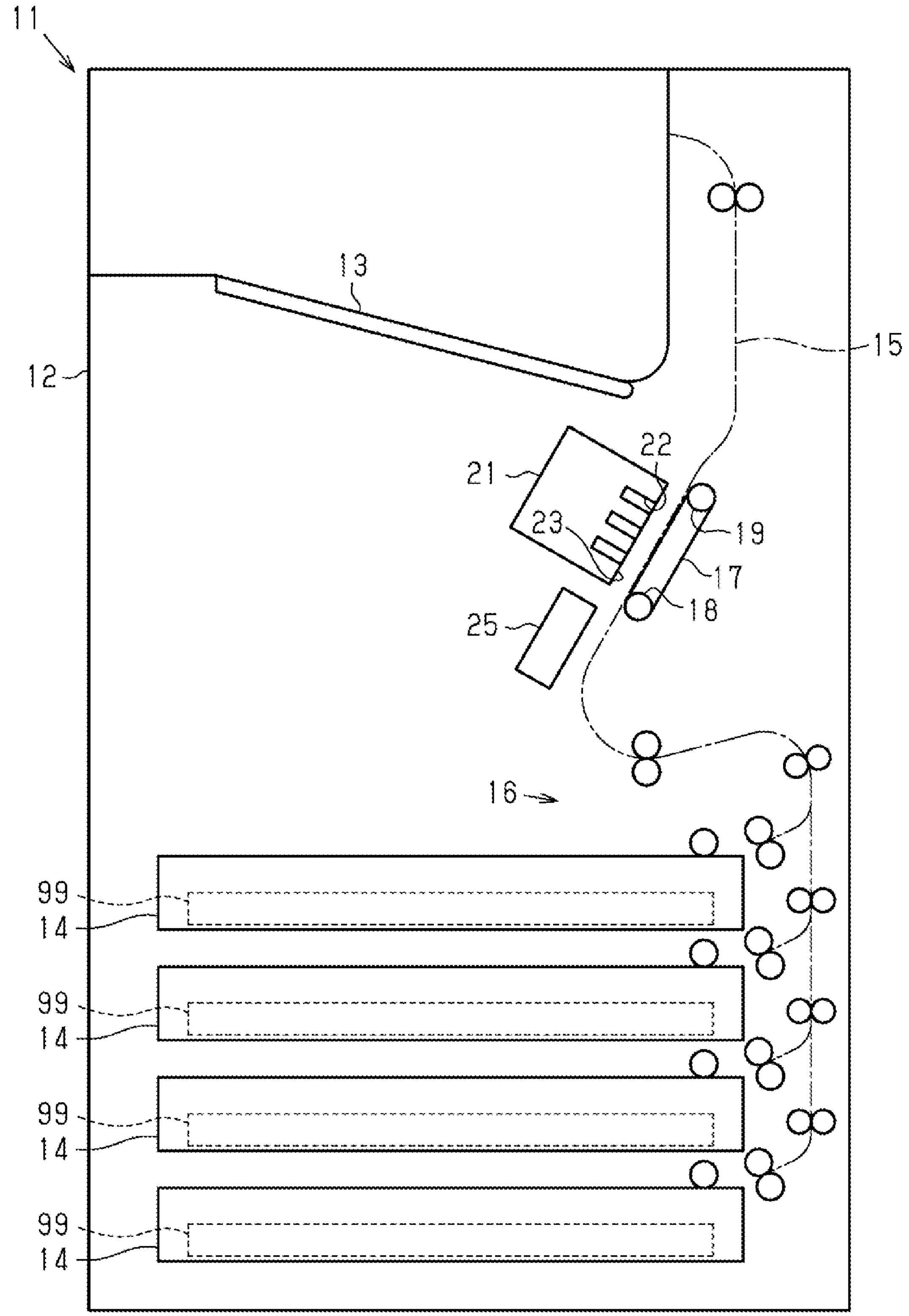
FIG. 1 is a side view illustrating an embodiment of a liquid ejection apparatus.

As illustrated in FIG. 1, a liquid ejection apparatus 11 includes a housing 12.

The liquid ejection apparatus 11 includes a cover 13. The cover 13 is attached to the housing 12. The cover 13 is configured to open and close with respect to the housing 12. In FIG. 1, the cover 13 is closed. When the cover 13 opens, the user can access the inside of the housing 12. The cover 13 is located at an upper part of the housing 12, for example. Therefore, the user can access the inside of the housing 12 from the upper part of the housing 12 by opening the cover 13. The cover 13 functions as a stacking portion where a medium 99 on which an image is recorded is loaded, for example. The liquid ejection apparatus 11 may separately include a stacking portion.

The liquid ejection apparatus 11 includes one or more housing portions 14. The housing portion 14 is configured to house the medium 99. The housing portion 14 is a cassette drawable from the housing 12, for example.

The liquid ejection apparatus 11 includes a conveyance path 15. The conveyance path 15 is a path through which the medium 99 is conveyed. The conveyance path 15 extends inside the housing 12. The conveyance path 15 extends to eject the medium 99 from the housing portion 14 to the outside of the housing 12, for example. An image is recorded on the medium 99 in the process of conveyance in the conveyance path 15. The medium 99 is ejected toward the cover 13 by being conveyed through the conveyance path 15. Specifically, the medium 99 is dropped from the terminal end of the conveyance path 15 to the cover 13 by being conveyed through the conveyance path 15.

The liquid ejection apparatus 11 includes a conveyance portion 16. The conveyance portion 16 is configured to convey the medium 99. The conveyance portion 16 includes one or more rollers, for example. The conveyance portion 16 conveys the medium 99 to be housed in the housing portion 14 along the conveyance path 15.

The conveyance portion 16 includes a conveyance belt 17, a first pulley 18, and a second pulley 19, for example. The conveyance belt 17 is wound around the first pulley 18 and the second pulley 19. The conveyance belt 17 suctions the medium 99 through electrostatic absorption, for example. In this manner, the conveyance belt 17 supports the medium 99. The conveyance belt 17 may be configured to suction the medium 99 by suctioning it with a negative pressure, for example. The first pulley 18 and the second pulley 19 are located along the conveyance path 15. When the first pulley 18 and the second pulley 19 rotate, the conveyance belt 17 rotates therearound. As a result, the medium 99 supported by the conveyance belt 17 is conveyed. The conveyance belt 17 conveys the medium 99 diagonally upward, for example.

The liquid ejection apparatus 11 includes an ejection portion 21. The ejection portion 21 is configured to eject liquid to the medium 99. The ejection portion 21 includes a nozzle surface 23 where one or more nozzles 22 opens. The ejection portion 21 is a line head that can eject a liquid simultaneously over the width of the entire medium 99, for example. The ejection portion 21 may be a serial head for scanning of the medium 99.

The ejection portion 21 is located to face the conveyance belt 17, for example. Specifically, the nozzle surface 23 faces the conveyance belt 17. The ejection portion 21 is located diagonally above the conveyance belt 17. The ejection portion 21 ejects liquid to the medium 99 supported by the conveyance belt 17. The ejection portion 21 ejects liquid in a direction different from the vertical direction. The ejection portion 21 ejects liquid diagonally downward, for example. The ejection portion 21 may eject liquid in a direction different from the vertical direction, not only toward the medium 99 supported by the conveyance belt 17, but also toward the medium 99 supported on a support stand, for example.

Figure 2:
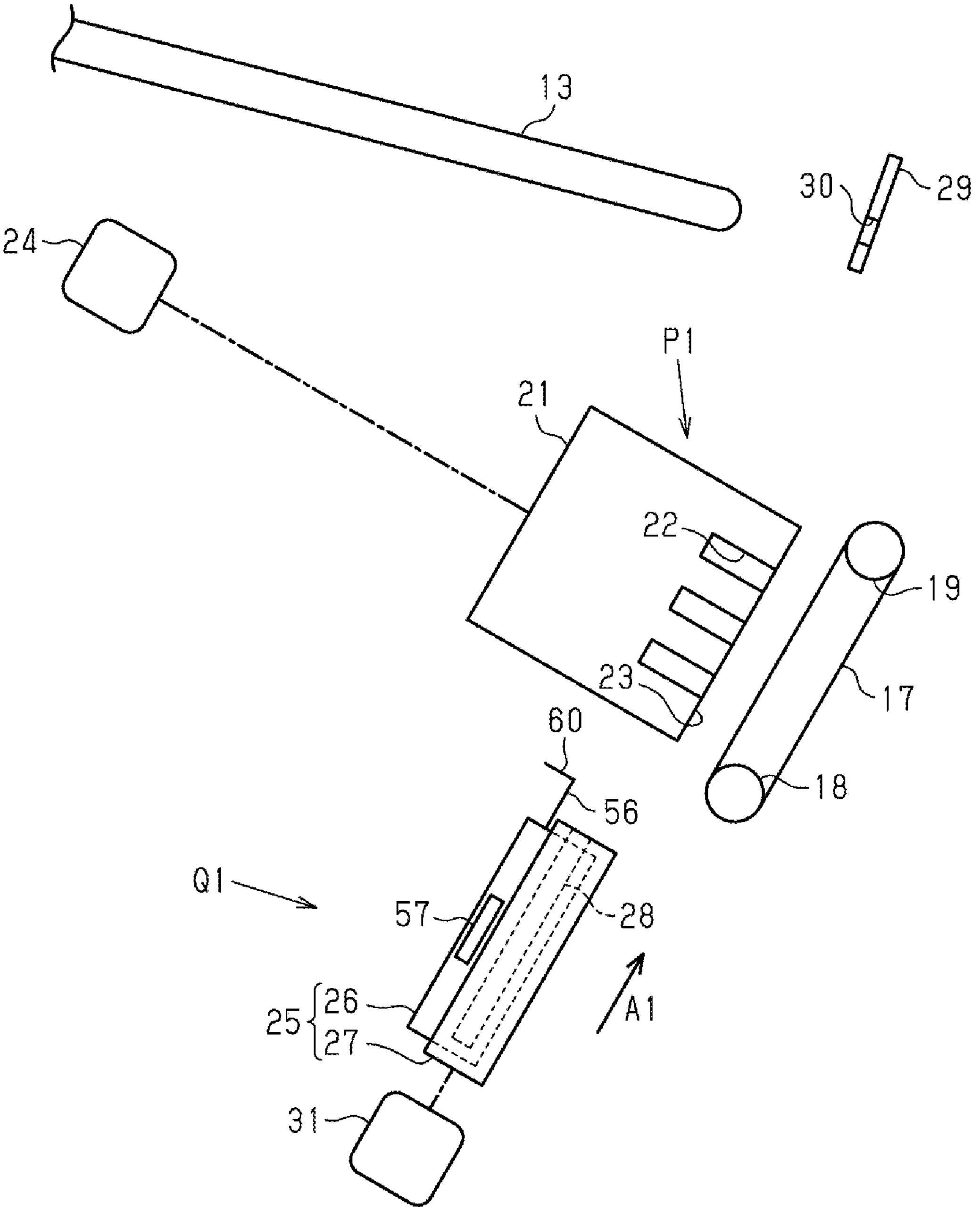
FIG. 2 is a side view illustrating a state where an ejection portion is located at an ejection position and a cap unit is located at a standby position.
Figure 3:
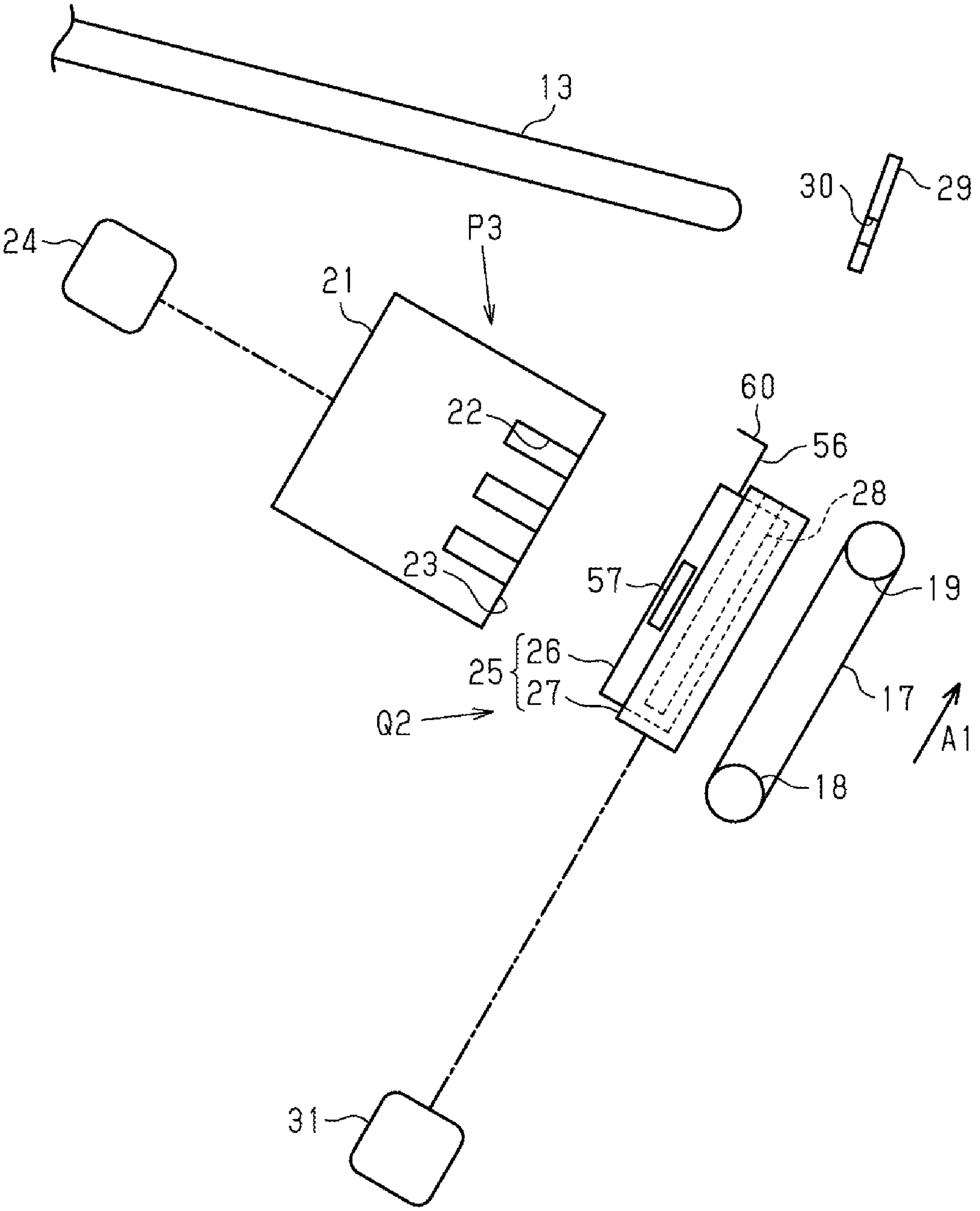
FIG. 3 is a side view illustrating a state where the ejection portion is located at a retreat position and the cap unit is located at an implementation position.
Figure 4:
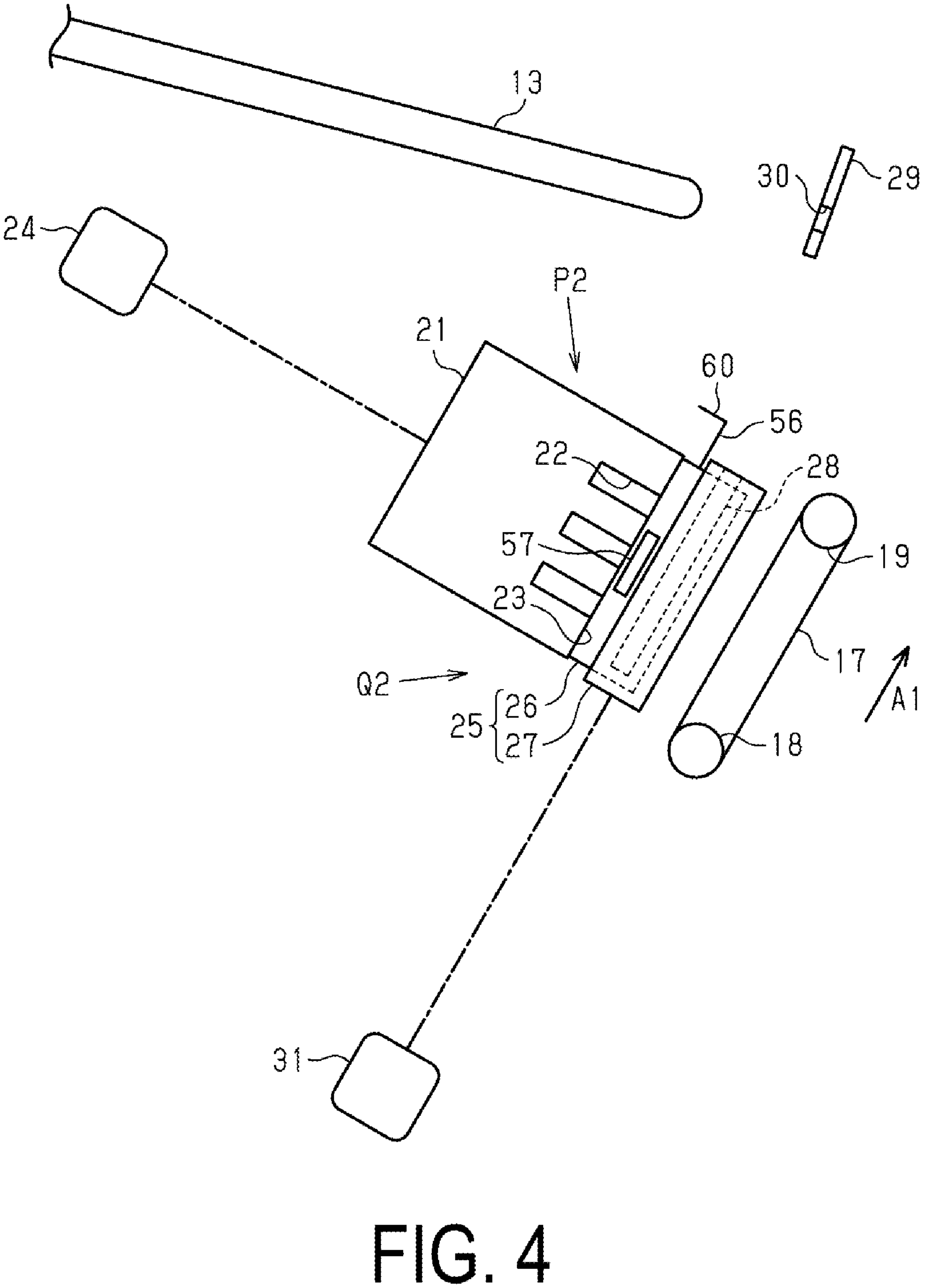
FIG. 4 is a side view illustrating a state where the ejection portion is located at a maintenance position and the cap unit is located at the implementation position.

As illustrated in FIGS. 2, 3, and 4, the liquid ejection apparatus 11 includes a driving mechanism 24. The driving mechanism 24 is a mechanism for moving the ejection portion 21. The driving mechanism 24 includes a rack and pinion, for example. The driving mechanism 24 moves the ejection portion 21 with respect to the conveyance belt 17. The driving mechanism 24 moves the ejection portion 21 in two directions, namely, the direction approaching the conveyance belt 17, and the direction away from the conveyance belt 17, for example. The driving mechanism 24 moves the ejection portion 21 in the direction perpendicular to the conveyance belt 17, for example. The driving mechanism 24 brings the ejection portion 21 closer to the conveyance belt 17 by moving the ejection portion 21 diagonally downward, for example. The driving mechanism 24 separates the ejection portion 21 from the conveyance belt 17 by moving the ejection portion 21 diagonally upward, for example.

The driving mechanism 24 displaces the ejection portion 21 to an ejection position P1, a maintenance position P2, and a retreat position P3. The ejection portion 21 illustrated in FIG. 2 is located at the ejection position P1. The ejection portion 21 illustrated in FIG. 3 is located at the retreat position P3. The ejection portion 21 illustrated in FIG. 4 is located at the maintenance position P2.

The ejection position P1 is a position of the case where the ejection portion 21 ejects liquid to the medium 99. Among the ejection position P1, the maintenance position P2, and the retreat position P3, the ejection position P1 is the position where the ejection portion 21 is closest to the conveyance belt 17.

The maintenance position P2 is a position of the case where maintenance is performed on the ejection portion 21. The maintenance position P2 is a position farther from the conveyance belt 17 than the ejection position P1, for example.

The retreat position P3 is a position of the case where the ejection portion 21 retreats. The retreat position P3 is a position where the ejection portion 21 goes through when the ejection portion 21 is displaced from the ejection position P1 to the maintenance position P2, and when the ejection portion 21 is displaced from the maintenance position P2 to the ejection position P1. The driving mechanism 24 temporarily retreats the ejection portion 21 to the retreat position P3 when displacing the ejection portion 21 between the ejection position P1 and the maintenance position P2. Among the ejection position P1, the maintenance position P2, and the retreat position P3, the retreat position P3 is the position farthest from the conveyance belt 17.

The liquid ejection apparatus 11 includes a cap unit 25. The cap unit 25 is a unit that performs maintenance of the ejection portion 21. The cap unit 25 performs capping of the ejection portion 21 by making contact with the ejection portion 21 for the purpose of reducing the risk of the drying of the liquid inside a nozzle 22, for example. The capping is maintenance for moisturizing the nozzle 22. The cap unit 25 performs the maintenance of the ejection portion 21 by performing the capping of the ejection portion 21 located at the maintenance position P2, for example.

The cap unit 25 may perform the maintenance of the ejection portion 21 by receiving the liquid ejected by the ejection portion 21 through flushing. The flushing is an operation of appropriately ejecting liquid by the ejection portion 21 for the purpose of suppressing the clogging of the nozzle 22. The cap unit 25 may perform the maintenance of the ejection portion 21 by receiving the liquid of the flushing from the ejection portion 21 located at the maintenance position P2, for example.

The cap unit 25 includes a cap 26 and a mounting portion 27. The cap 26 is detachably mounted to the mounting portion 27. The cap 26 is detachable from the mounting portion 27. Therefore, the cap 26 is replaceable for the mounting portion 27. The cap 26 is detached from the mounting portion 27 from above by opening the cover 13, for example. The cap 26 will be elaborated later. The mounting portion 27 includes a guide 28. The guide 28 defines a detaching direction A1. The detaching direction A1 is a direction in which the cap 26 moves when the cap 26 is detached from the mounting portion 27. The guide 28 is a rail extending in the detaching direction A1, for example. The guide 28 guides the cap 26 to be detached in the detaching direction A1.

Figure 5:
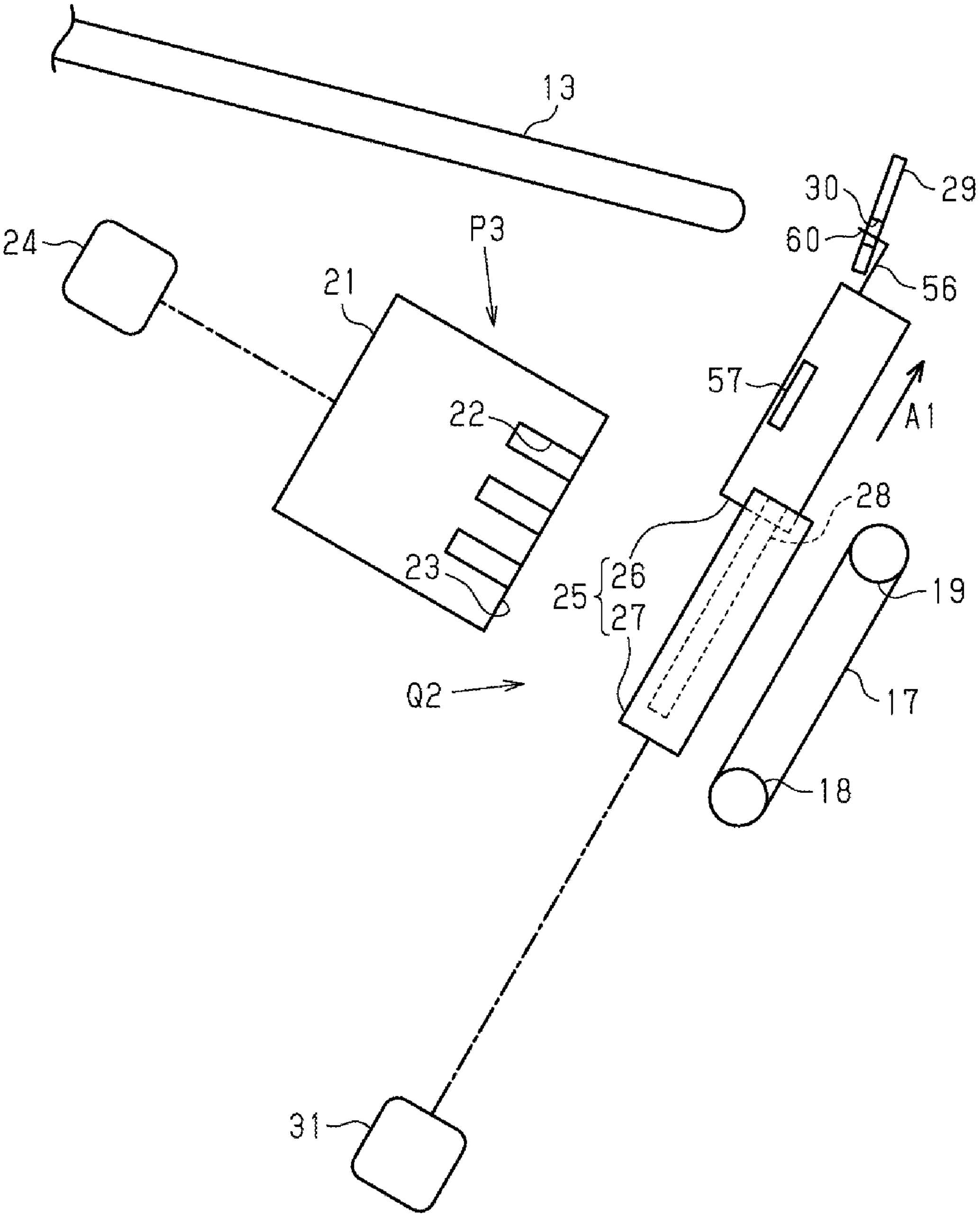
FIG. 5 is a side view illustrating a state of detaching the cap from a mounting portion.

As illustrated in FIG. 5, the liquid ejection apparatus 11 includes a holding portion 29. The holding portion 29 is configured to hold the cap 26 detached from the mounting portion 27. When the cap 26 is detached, the holding portion 29 temporarily holds the cap 26. As viewed from the detaching direction A1, the holding portion 29 is located at a position overlapping the cap 26. Specifically, as viewed from the detaching direction A1, the holding portion 29 is located at a position overlapping the cap 26 mounted to the mounting portion 27. In this manner, the cap 26 moves in the detaching direction A1 from the mounting portion 27, and thus the cap 26 reaches the holding portion 29. Thus, the holding portion 29 can easily hold the cap 26.

The holding portion 29 is located above the mounting portion 27. That is, in this case, the detaching direction A1 is an upward direction. In this manner, the cap 26 can be easily held by the holding portion 29 when the cap 26 is detached from above the mounting portion 27.

The holding portion 29 receives the load of the cap 26 by holding the cap 26. Therefore, preferably, the holding portion 29 has rigidity. The reason for this is that the cap 26 has a large weight. In particular, in the case where the ejection portion 21 is a line head, the cap 26 is also wide matching the ejection portion 21, and consequently the weight of the cap 26 also tends to be increased. The holding portion 29 is a metal frame making up the liquid ejection apparatus 11, for example. The holding portion 29 includes one or more holding holes 30, for example.

When a part of the cap 26 is inserted to the holding hole 30, the cap 26 is hooked onto the holding portion 29. In this manner, the holding portion 29 holds the cap 26. The holding portion 29 holds the cap 26 in such a manner that the cap 26 does not face downward. That is, the holding portion 29 holds the cap 26 in a posture in which the cap 26 faces upward. In this manner, in the state where the holding portion 29 holds the cap 26, the risk of liquid spillage from the cap 26 is reduced. As illustrated in FIGS. 2, 3, and 4, the liquid ejection apparatus 11 includes a moving mechanism 31.

The moving mechanism 31 is a mechanism that moves the cap unit 25. Specifically, the moving mechanism 31 moves the mounting portion 27. Along with this, the cap 26 moves. The moving mechanism 31 includes a rack and pinion, for example. The moving mechanism 31 moves the cap unit 25 with respect to the conveyance belt 17. The moving mechanism 31 moves the cap unit 25 in two directions, namely, the direction approaching the conveyance belt 17 and the direction away from the conveyance belt 17, for example. The moving mechanism 31 brings the cap unit 25 closer to the conveyance belt 17 by moving the cap unit 25 diagonally upward, for example. The moving mechanism 31 separates the cap unit 25 from the conveyance belt 17 by moving the cap unit 25 diagonally downward, for example. The moving mechanism 31 moves the cap unit 25 in a direction different from the direction in which the driving mechanism 24 moves the ejection portion 21. The moving mechanism 31 positions the cap unit 25 above the conveyance belt 17 by bringing it closer to the conveyance belt 17.

Specifically, the moving mechanism 31 positions the cap unit 25 between the conveyance belt 17 and the ejection portion 21 by bringing the cap unit 25 closer to the conveyance belt 17. In this state, when the ejection portion 21 approaches the conveyance belt 17, the cap 26 makes contact with the nozzle surface 23. In this manner, the capping of the ejection portion 21 is performed. The moving mechanism 31 displaces the cap unit 25 to a standby position Q1 and an implementation position Q2.

The cap unit 25 illustrated in FIG. 2 is located at the standby position Q1. The cap unit 25 illustrated in FIG. 2 is located at the standby position Q1. The cap unit 25 illustrated in FIGS. 3 and 4 is located at the implementation position Q2.

The standby position Q1 is a position of the case where the cap unit 25 stands by. The cap unit 25 is located at the standby position Q1 when the maintenance of the ejection portion 21 is not performed, such as when the ejection portion 21 is ejecting liquid to the medium 99. The standby position Q1 is a position farther from the conveyance belt 17 than the implementation position Q2, for example.

The implementation position Q2 is a position where the cap unit 25 performs the maintenance of the ejection portion 21. The implementation position Q2 is a position where the cap unit 25 performs capping of the ejection portion 21, or receives the flushing. The implementation position Q2 is a position between the conveyance belt 17 and the ejection portion 21.

When the cap unit 25 performs the maintenance of the ejection portion 21, first, the ejection portion 21 displaces from the ejection position P1 to the retreat position P3. During or after the displacement of the ejection portion 21 from the ejection position P1 to the retreat position P3, the cap unit 25 displaces from the standby position Q1 to the implementation position Q2. After the cap unit 25 displaces to the implementation position Q2, the ejection portion 21 displaces from the retreat position P3 to the maintenance position P2. In this manner, the cap unit 25 can perform the maintenance on the ejection portion 21.

As illustrated in FIG. 5, preferably, when replacing the cap 26, the ejection portion 21 is located at the retreat position P3, and the cap unit 25 is located at the implementation position Q2. In this manner, the distance between the ejection portion 21 and the cap unit 25 is increased, and the risk of the interference of the cap 26 detached from the mounting portion 27 with the ejection portion 21 is reduced. In addition, at the implementation position Q2, the cap unit 25 is located on the upper side than the standby position Q1, the cap 26 can be easily replaced from above the mounting portion 27.

Cap

Figure 6:
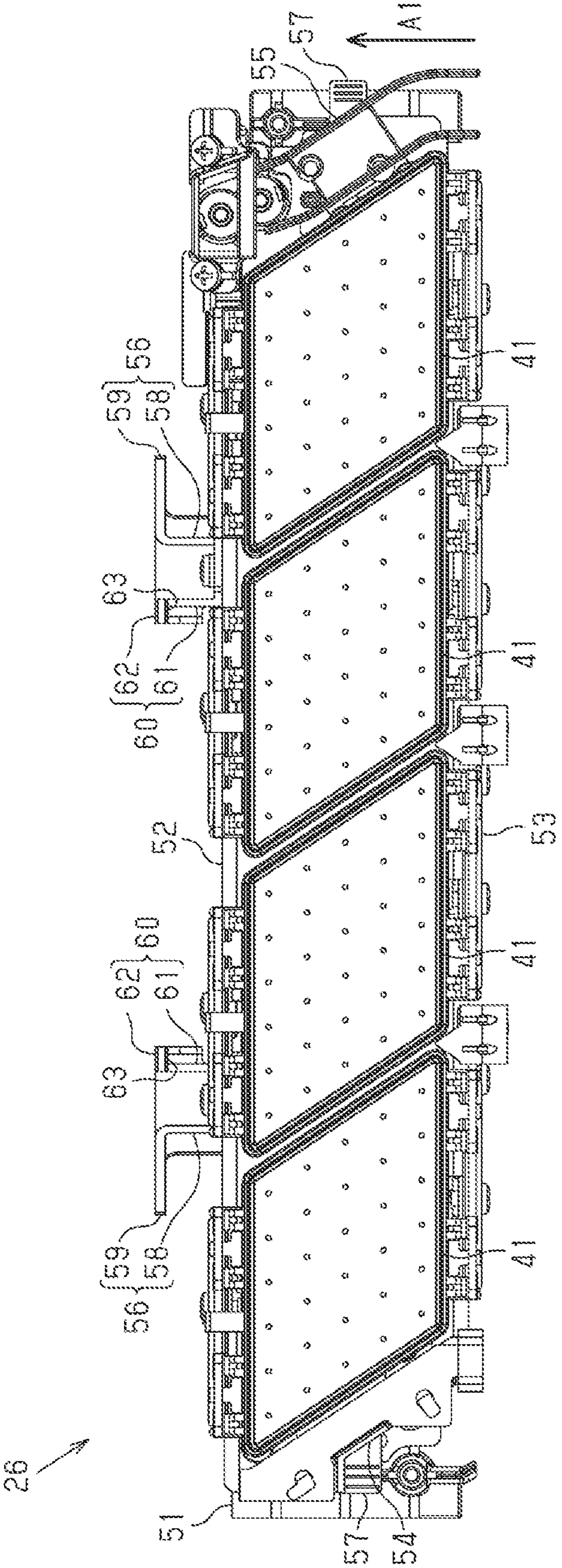
FIG. 6 is a front view of the cap.
Figure 7:
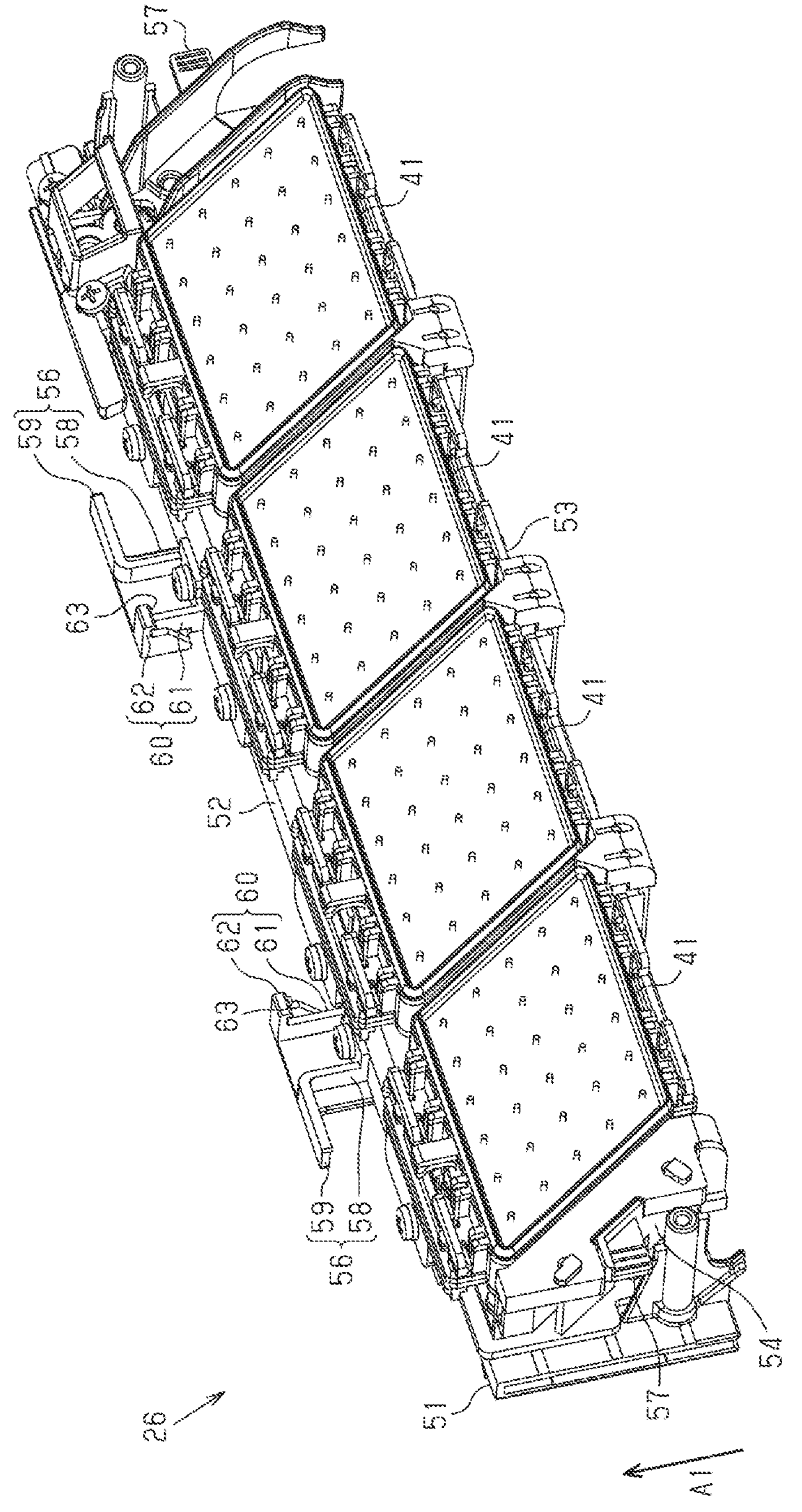
FIG. 7 is a perspective view of the cap.
Figure 8:
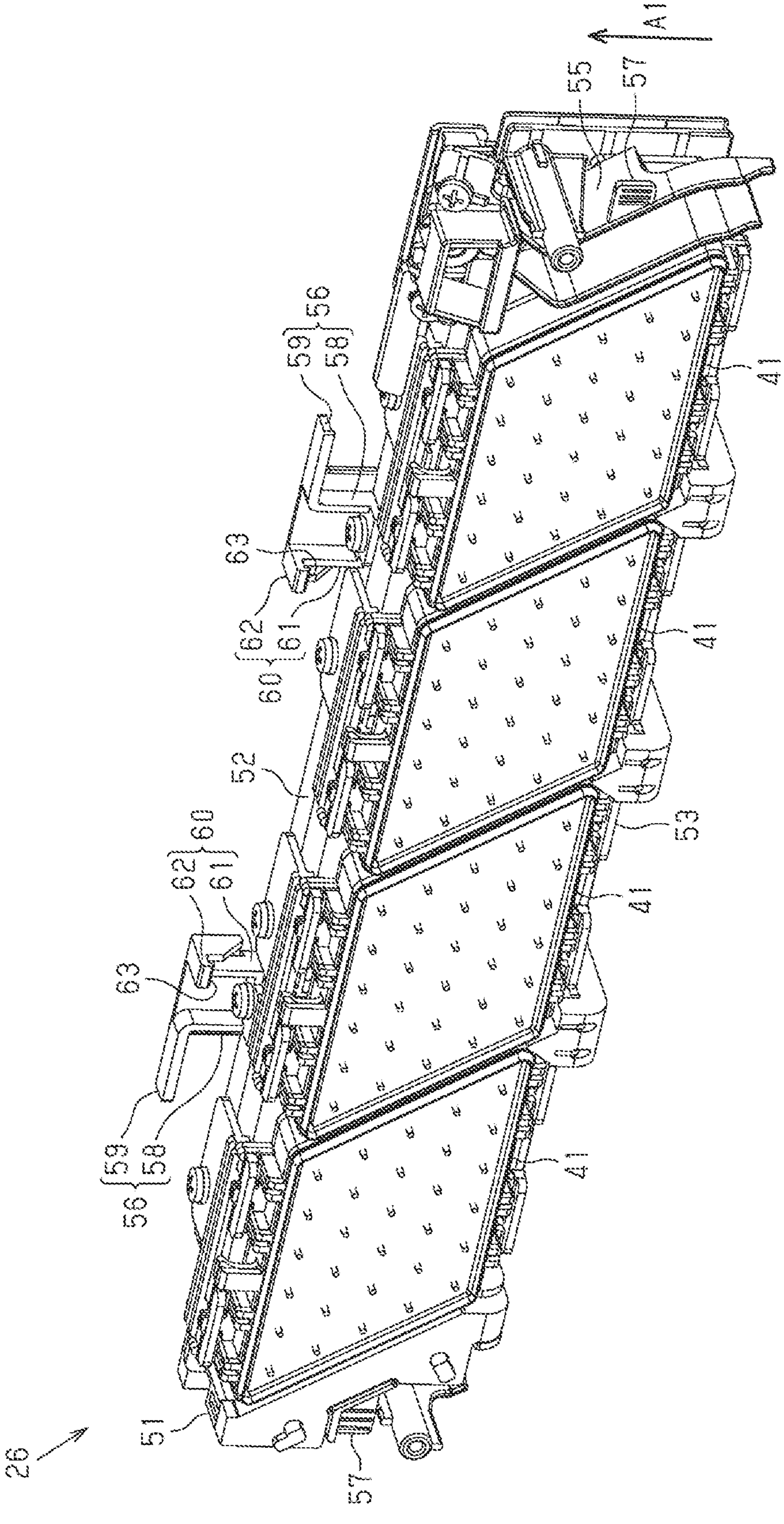
FIG. 8 is a perspective view of the cap as viewed in an angle different from FIG. 7.

As illustrated in FIGS. 6, 7, and 8, the cap 26 includes one or more cap members 41. The cap member 41 is a member that makes contact with the nozzle surface 23 during the capping. The cap member 41 is also a member that receives the liquid ejected from the ejection portion 21 through the flushing. During the capping, the cap member 41 makes contact with the nozzle surface 23 in a manner surrounding the nozzle 22. In this manner, the cap member 41 forms the space in communication with the nozzle 22. In the above-described manner, the cap 26 forms the space in communication with the nozzle 22 by making contact with the ejection portion 21.

The cap 26 includes four cap members 41, for example. The four cap members 41 are aligned in one direction. In the case where the ejection portion 21 is a line head, the cap 26 need also be wide in accordance with the ejection portion 21. In view of this, with the plurality of the cap members 41 aligned in one direction, the cap 26 has a wide size. The cap 26 may perform the capping of the ejection portion 21 with one wide cap member 41.

Figure 9:
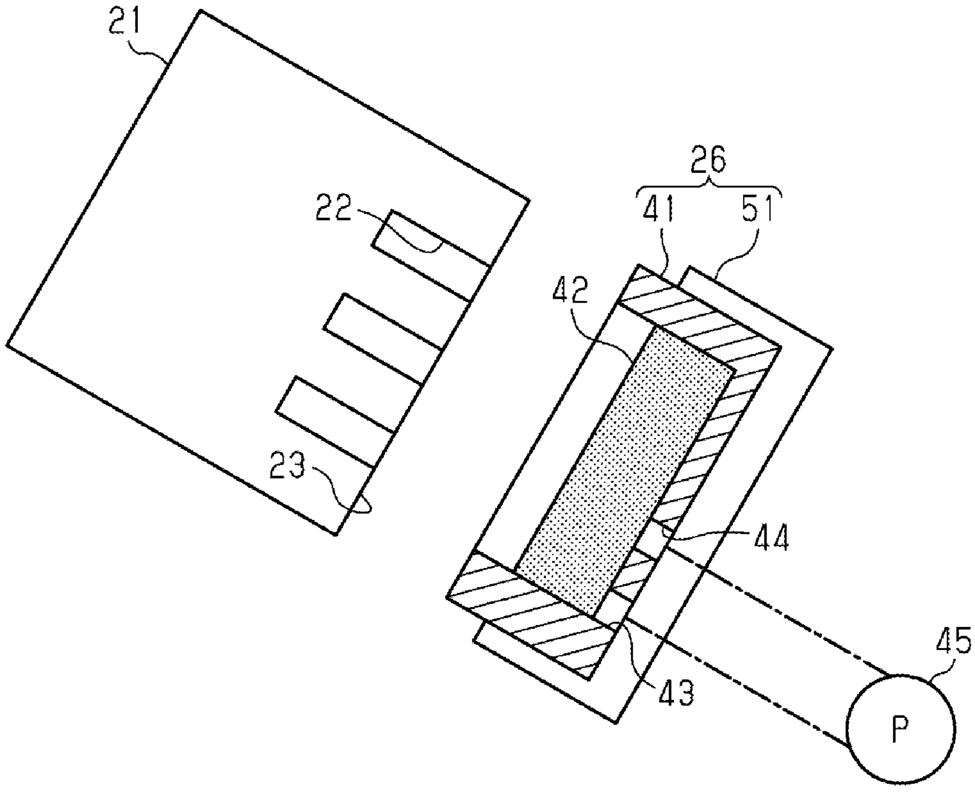
FIG. 9 is a schematic sectional view of the cap.

As illustrated in FIG. 9, the cap 26 may include an absorbent material 42. The absorbent material 42 is located inside the cap member 41. The absorbent material 42 absorbs the liquid ejected by the ejection portion 21. For example, when the ejection portion 21 ejects liquid to the cap member 41 for the flushing, the absorbent material 42 absorbs the liquid. When the capping is performed in the state where the absorbent material 42 absorbs the liquid, the nozzle 22 is more moisturized. This is so-called moisturizing capping.

One or more ejection holes may open at the cap member 41. A first ejection hole 43 and a second ejection hole 44 may open at the cap member 41, for example. The first ejection hole 43 is a hole located below the second ejection hole 44 in the state where the cap 26 is mounted to the mounting portion 27.

A pump 45 of the liquid ejection apparatus 11 may suction the inside of the cap member 41 through the first ejection hole 43 or the second ejection hole 44. In this manner, liquid is ejected from the cap member 41, and thus the amount of liquid absorbed by the absorbent material 42 is adjusted.

The amount of liquid ejected from the cap member 41 differs between the case where it is suctioned through the first ejection hole 43, and the case where it is suctioned through the second ejection hole 44. The reason for this is that the first ejection hole 43 and the second ejection hole 44 differ from each other in positions in the vertical direction. In the case where the pump 45 suctions the inside of the cap member 41 through the first ejection hole 43, the amount of liquid ejected from the cap member 41 is larger than the case where the pump 45 suctions the inside of the cap member 41 through the second ejection hole 44. Therefore, for example, when replacing the cap 26, the risk of liquid spillage from the cap 26 during the replacement is reduced by ejecting the liquid from the cap member 41 through the first ejection hole 43.

The liquid can be compulsorily ejected from the ejection portion 21 by driving the pump 45 in the state where the cap 26 performs capping of the ejection portion 21. This is so-called suction cleaning. The suction cleaning is an example of the maintenance. Through the suction cleaning, bubbles, foreign matters and the like are ejected together with the liquid from the ejection portion 21.

The cap 26 includes a holder 51 as illustrated in FIGS. 6, 7, and 8. The holder 51 is a member that holds the cap member 41. The holder 51 is a frame with a cuboid shape, for example.

The holder 51 includes a front surface 52 and a rear surface 53. The front surface 52 is a surface that faces the holding portion 29 in the state where the cap 26 is mounted to the mounting portion 27. That is, the front surface 52 is a front surface in the detaching direction A1. The rear surface 53 is a surface that faces away from the front surface 52. That is, the rear surface 53 is a rear surface in the detaching direction A1.

The holder 51 includes a first side surface 54 and a second side surface 55. The first side surface 54 and the second side surface 55 are surfaces connected to the front surface 52 and the rear surface 53, respectively. Since the cap 26 is wide, the distance between the first side surface 54 and the second side surface 55 is greater than the distance between the front surface 52 and the rear surface 53.

The holder 51 includes one or more grabbing portions. The grabbing portion is grabbed by the user during the replacement of the cap 26. For example, by grabbing the grabbing portion, the user moves the cap 26 in the detaching direction A1 with respect to the mounting portion 27. The user grabs the grabbing portion by opening the cover 13 and inserting the hand from above the mounting portion 27, for example. The user detaches the cap 26 from the mounting portion 27 by pulling, e.g., lifting, the cap 26 in the state of grabbing the grabbing portion.

The holder 51 includes one or more first grabbing portions 56 and one or more second grabbing portions 57. The holder 51 includes two first grabbing portions 56, and two second grabbing portions 57, for example. When the cap 26 is detached from the mounting portion 27, the first grabbing portion 56 is grabbed first by the user, for example. When the cap 26 is detached from the mounting portion 27, the second grabbing portion 57 is grabbed after the cap 26 is held by the holding portion 29, for example.

The first grabbing portion 56 extends from the front surface 52. The first grabbing portion 56 extends in the detaching direction A1 from the front surface 52. The first grabbing portion 56 extends in the detaching direction A1 and then bends to extend to the lateral side. Since, the first grabbing portion 56 extends in a hook shape. In this manner, the user can easily put the hand on the first grabbing portion 56. When the user pulls the first grabbing portion 56 in the extending direction of the first grabbing portion 56, the cap 26 moves in the detaching direction A1. With the first grabbing portion 56 extending in the detaching direction A1, the user can intuitively determine the detaching direction A1.

The first grabbing portion 56 includes a holding base end portion 58, and a holding top end portion 59. The holding base end portion 58 is a portion extending from the front surface 52. The holding base end portion 58 extends in the detaching direction A1. The holding top end portion 59 is a portion extending from the holding base end portion 58. The holding top end portion 59 extends in the direction parallel to the front surface 52. By putting the hand on the holding top end portion 59, the user detaches the cap 26 from the mounting portion 27, for example.

The two first grabbing portions 56 are located with a predetermined distance therebetween at the front surface 52. In the two first grabbing portions 56, the respective holding top end portions 59 extend to face away from each other. For example, in the two first grabbing portions 56, the holding top end portion 59 of one first grabbing portion 56 extends toward the first side surface 54, while the holding top end portion 59 of the other first grabbing portion 56 extends toward the second side surface 55. In the two first grabbing portions 56, the respective holding top end portions 59 extend to face outside with respect to the center of the cap 26. In this manner, the user can easily hold the two first grabbing portions 56 with both hands.

The second grabbing portion 57 extends from the side surface. The second grabbing portion 57 extends toward the lateral side. The second grabbing portion 57 extends in the direction parallel to the front surface 52. That is, the second grabbing portion 57 extends in the same direction as the holding top end portion 59. The second grabbing portion 57 is a plate on which an anti-slip rib is formed, for example.

With the second grabbing portion 57, the user can change the holding of the cap 26 in the process of detaching the cap 26 from the mounting portion 27. For example, in the case where the user detaches the cap 26 from the mounting portion 27 while holding the first grabbing portion 56, the posture of the cap 26 is tilted about the first grabbing portion 56 as a fulcrum, and as a result the cap 26 may possibly face downward. In particular, when the cap 26 is pulled upward from the housing 12 with the first grabbing portion 56 held, the cap 26 is likely to face downward. In view of this, the risk of causing the cap 26 to face downward when detaching the cap 26 from the mounting portion 27 is reduced by moving the cap 26 in the detaching direction A1 with the first grabbing portion 56 held and then changing the holding to the second grabbing portion 57.

The two second grabbing portions 57 extend from the first side surface 54 and the second side surface 55. Specifically, the two second grabbing portions 57 are located at both ends of the cap 26. The two second grabbing portions 57 extend in opposite directions. The two second grabbing portions 57 extend to face outside with respect to the center of the cap 26. In this manner, the user can easily hold the two second grabbing portions 57 with both hands.

Figure 10:
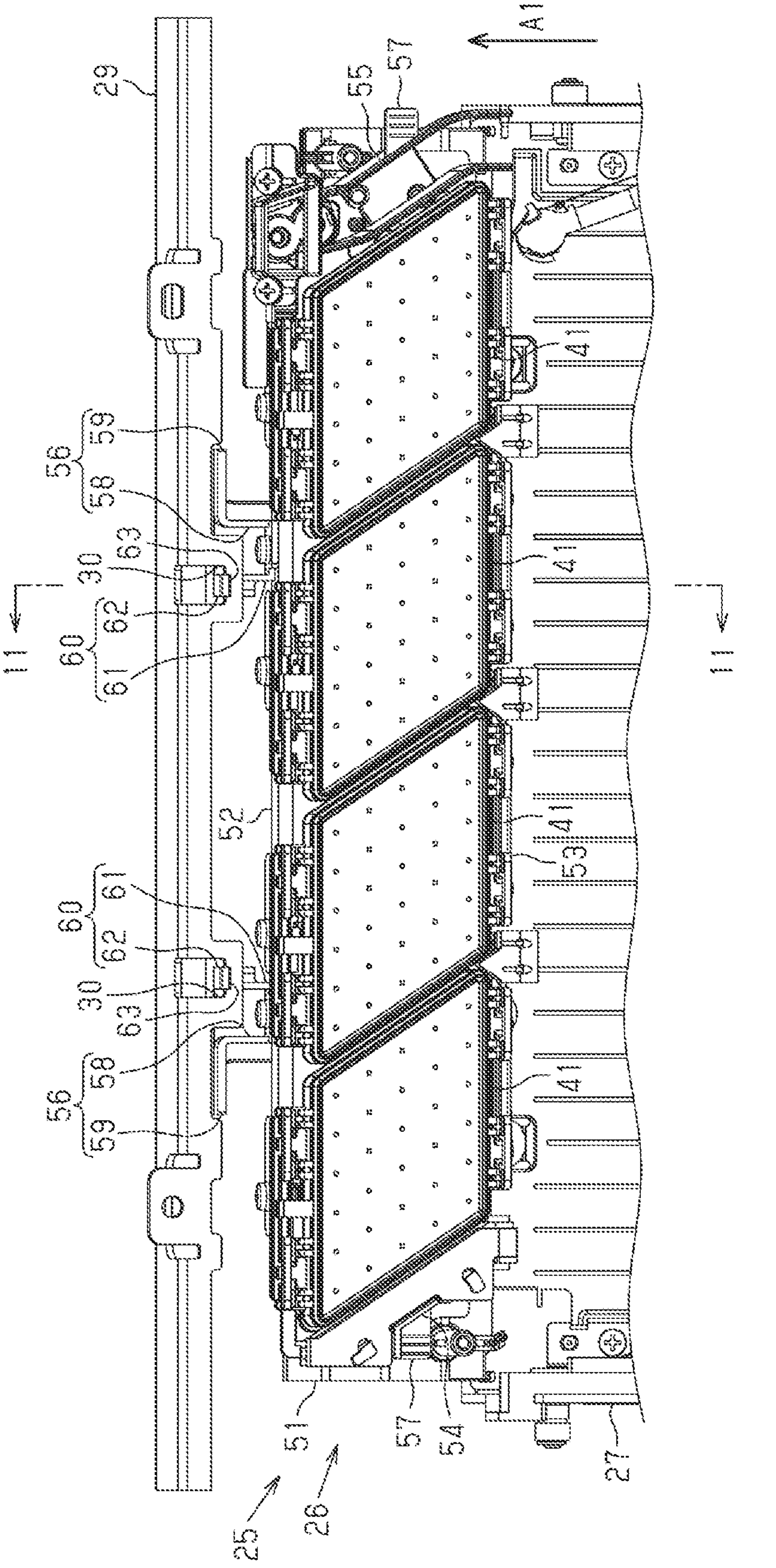
FIG. 10 is a front view illustrating a state of detaching the cap from the mounting portion.
Figure 11:
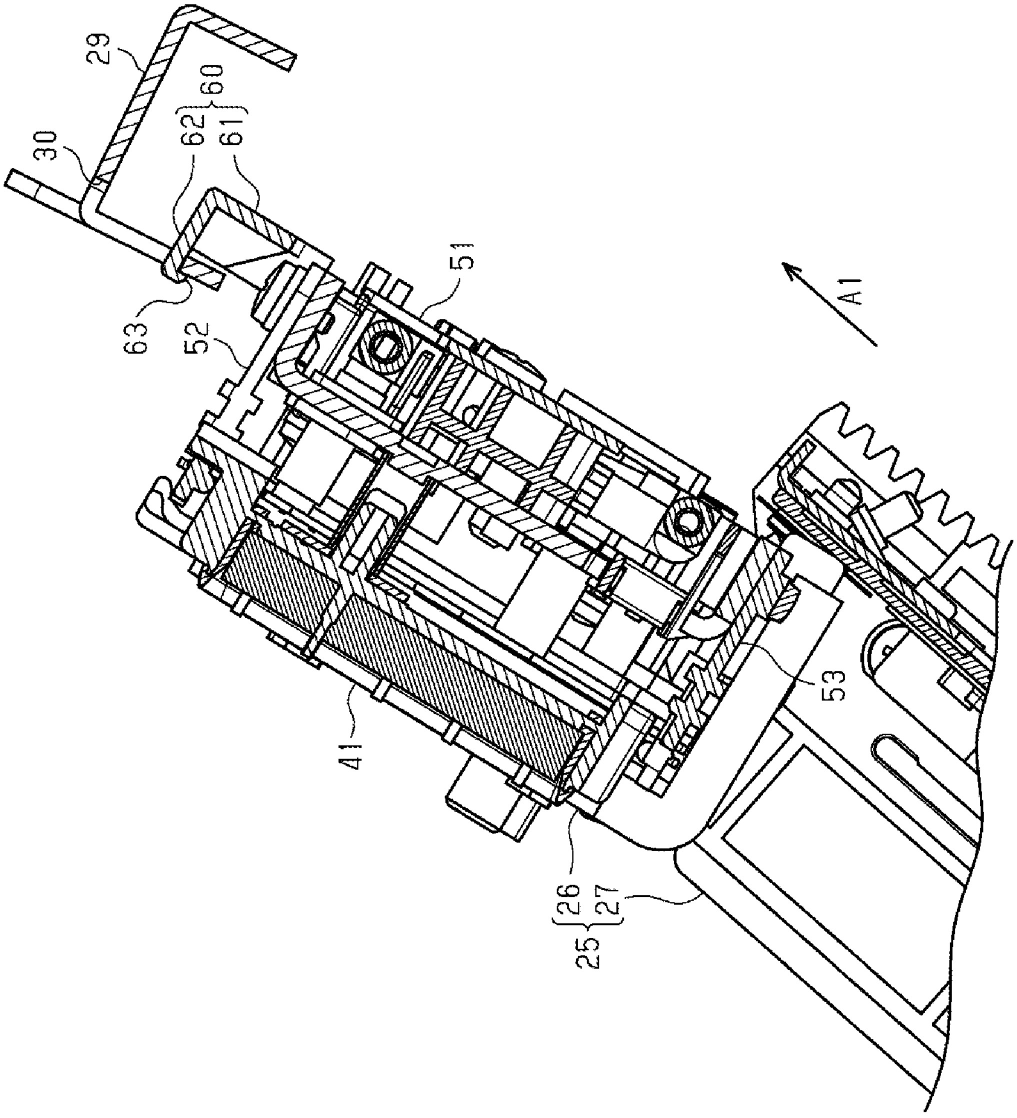
FIG. 11 is a cross-sectional view taken along line 11-11 in FIG. 10.

As illustrated in FIGS. 10 and 11, the holder 51 includes one or more contact portions 60. The holder 51 includes two contact portions 60, for example. The contact portion 60 is hooked onto the holding portion 29. Specifically, the contact portion 60 is inserted into the holding hole 30 so as to be hooked onto the holding portion 29. In this manner, the cap 26 is held by the holding portion 29.

The contact portion 60 extends from the front surface 52. The contact portion 60 extends in the detaching direction A1 from the front surface 52. The contact portion 60 extends in the detaching direction A1, and then bends toward the ejection portion 21. That is, the contact portion 60 extends in a hook shape. With the contact portion 60 extending from the front surface 52 as with the first grabbing portion 56, the user can easily hook the contact portion 60 onto the holding portion 29 in the state of holding the first grabbing portion 56.

By holding the cap 26 by the holding portion 29 with the contact portion 60, the user can change the holding of the cap 26 in the process of detaching the cap 26 from the mounting portion 27. That is, the user can change the holding from the first grabbing portion 56 to the second grabbing portion 57, for example. For example, the user can change the holding from the state of grabbing the first grabbing portion 56 to the state of supporting the cap 26 with both hands from below. In this manner, when detaching the cap 26 from the mounting portion 27, the risk of causing the cap 26 to face downward is reduced.

The contact portion 60 includes a contact base end portion 61 and a contact top end portion 62. The contact base end portion 61 is a portion extending from the front surface 52. The contact base end portion 61 extends in the detaching direction A1. The contact top end portion 62 is a portion extending from the contact base end portion 61. The contact top end portion 62 extends in the direction parallel to the front surface 52. The contact top end portion 62 extends in the direction different from the holding top end portion 59. When the contact top end portion 62 is inserted into the holding hole 30, the cap 26 is held by the holding portion 29.

The contact portion 60 may include a protrusion 63 at the top end of the contact top end portion 62. With the protrusion 63 hooked onto the edge of the holding hole 30, the contact portion 60 is less dropped off from the holding portion 29. In this manner, the posture of the cap 26 held by the holding portion 29 is easily stabilized.

The two contact portions 60 are located with a predetermined distance therebetween at the front surface 52. The two contact portions 60 are inserted to two holding holes 30. In this manner, the posture of the cap 26 held by the holding portion 29 is easily stabilized.

The contact portion 60 may be integrated with the first grabbing portion 56. The contact portion 60 may include a portion shared with the first grabbing portion 56, for example. For example, the contact base end portion 61 may be shared with the holding base end portion 58. Specifically, the contact top end portion 62 and the holding top end portion 59 extend in a bent manner from the common base end portion. In this manner, the user can easily insert the contact portion 60 into the holding hole 30 in the state of holding the first grabbing portion 56.

Operational Effects

Next, operational effects of the above-mentioned examples are described.

(1) The cap 26 includes the grabbing portion that can be grabbed by the operator, and the contact portion 60 that can be hooked onto the holding portion 29. With the above-mentioned configuration, by hooking the contact portion 60 onto the holding portion 29, the user can change the holding of the cap 26 in the process of detaching the cap 26 from the mounting portion 27. In this manner, the risk of liquid spillage from the cap 26 when the cap 26 is detached is reduced.

(2) The cap 26 is detached from above the mounting portion 27. The holding portion 29 is located above the mounting portion 27.

With the above-mentioned configuration, the cap 26 can be easily held by the holding portion 29 in the process of detaching the cap 26 from the mounting portion 27.

(3) The cap 26 includes, at both ends, the second grabbing portion 57 that can be held by the operator.

With the above-mentioned configuration, with the first grabbing portion 56 and the second grabbing portion 57, the user can change the holding of the cap 26 in the process of detaching the cap 26. In this manner, when the cap 26 is detached, the risk of tilting the cap 26 into the posture that causes liquid spillage from the cap 26 is reduced.

(4) The ejection portion 21 is a line head that can eject the liquid simultaneously over the width of the medium 99.

In the case where the ejection portion 21 is a line head, the width of the cap 26 is also large matching the width of the ejection portion 21. Therefore, the weight of the cap 26 is likely to increase. If the weight of the cap 26 is large, the posture of the cap 26 is likely to be destabilized when the cap 26 is detached. In view of this, with the above-mentioned configuration, the user can change the holding of the cap 26 by causing the cap 26 to hold the holding portion 29 in the process of detaching the cap 26. Thus, the risk of liquid spillage from the cap 26 is reduced even with the cap 26 with a large weight for the line head.

(5) The first grabbing portion 56 extends from the front surface 52 of the cap 26 in the detaching direction A1.

With the above-mentioned configuration, when the cap 26 is pulled so as to bring the first grabbing portion 56 closer to the holding portion 29, the cap 26 moves in the detaching direction from the mounting portion 27. Therefore, the user can easily move the cap 26 in the detaching direction A1.

(6) The contact portion 60 extends from the front surface 52.

With the above-mentioned configuration, since the contact portion 60 extends from the front surface 52 as with the first grabbing portion 56, the user can easily hook the contact portion 60 onto the holding portion 29 in the state of grabbing the first grabbing portion 56.

(7) The first grabbing portion 56 and the contact portion 60 are integrally constructed.

With the above-mentioned configuration, the user can easily hook the contact portion 60 onto the holding portion 29 in the state of grabbing the first grabbing portion 56.

(8) The holding portion 29 is a metal frame making up the liquid ejection apparatus 11.

With the above-mentioned configuration, the risk of deformation of the holding portion 29 due to the weight of the cap 26 is reduced.

(9) The holding portion 29 holds the cap 26 in the posture in which the cap 26 faces upward.

With the above-mentioned configuration, in the state where the cap 26 is held by the holding portion 29, the risk of liquid spillage from the cap 26 is reduced.

Modifications

The above-mentioned examples may be modified as follows for implementation. The above-mentioned examples and the following modifications may be combined for implementation insofar as they are not technically inconsistent.

The liquid ejection apparatus 11 is configured such that the cap 26 is detachable through a hole opening at the side surface of the housing 12. That is, the cap 26 is not limited to the configuration in which it is detached from above the mounting portion 27.

The detaching direction A1 in not limited to the diagonally upward direction, and may be a diagonally downward direction, for example.

The cap member 41 and the holder 51 may be integrally constructed.

The grabbing portion provided in the cap 26 may be only the second grabbing portion 57. In this case, the user moves the cap 26 in the detaching direction A1 by grabbing the second grabbing portion 57 located at both ends of the cap 26. After holding the cap 26 by the holding portion 29, the user changes the holding of the cap 26 to support it from below, for example. In this manner, the risk of liquid spillage from the cap 26 is reduced.

The liquid ejected from the ejection portion 21 is not limited to ink, but may be a liquid member in which particles of functional materials are dispersed or mixed in liquid or the like, for example. For example, the ejection portion 21 may eject a liquid member in which materials such as electrode materials or pixel materials used for manufacturing liquid crystal displays, electroluminescence displays and surface-emitting displays are dispersed or dissolved.

Technical Ideas

Technical ideas and operational effects thereof derived from the above-described embodiments and modifications are described below.

(A) A liquid ejection apparatus includes an ejection portion including a nozzle surface at which one or more nozzles open, and configured to eject, from the nozzle, liquid in a direction different from a vertical direction, a cap configured to form a space in communication with the nozzle by making contact with the ejection portion, a mounting portion to which the cap is detachably mounted, and a holding portion configured to hold the cap detached from the mounting portion. The cap includes a grabbing portion configured to be grabbed by an operator, and a contact portion configured to be hooked onto the holding portion.

With the above-mentioned configuration, the user can change the holding of the cap by hooking the contact portion onto the holding portion in the process of detaching the cap from the mounting portion. In this manner, the risk of liquid spillage from the cap when detaching the cap is reduced.

(B) In the liquid ejection apparatus described above, the cap may be detached from above with respect to the mounting portion, and the holding portion may be located above the mounting portion.

With the above-mentioned configuration, the cap can be easily held by the holding portion in the process of detaching the cap from the mounting portion.

(C) In the liquid ejection apparatus described above, the grabbing portion may be a first grabbing portion, and the cap may include a second grabbing portion at both ends of the cap, the second grabbing portion being configured to be held by the operator.

With the above-mentioned configuration, with the first grabbing portion and the second grabbing portion, the user can change the holding of the cap in the process of detaching the cap. In this manner, the risk of tilting the cap into a posture in which liquid spillage from the cap occurs when detaching the cap is reduced.

(D) In the liquid ejection apparatus described above, the ejection portion may be a line head configured to eject liquid simultaneously over a width of a medium.

In the case where the ejection portion is a line head, the width of the cap is also large matching the width of the ejection portion. As such the weight of the cap is likely to increase. If the cap has a large weight, the posture of the cap is easily destabilized when detaching the cap. In view of this, with the above-mentioned configuration, the user can change the holding of the cap by holding the cap with the holding portion in the process of detaching the cap. Thus, even with a cap with a large weight configured for a line head, the risk of liquid spillage from the cap is reduced.

(E) In the liquid ejection apparatus described above, the mounting portion may include a guide configured to define a detaching direction of the cap, and the grabbing portion may extend from a front surface of the cap in the detaching direction.

With the above-mentioned configuration, when the cap is pulled so as to bring the grabbing portion closer to the holding portion, the cap moves in the detaching direction from the mounting portion. Thus, the user can easily move the cap in the detaching direction.

(F) In the liquid ejection apparatus described above, the contact portion may extend from the front surface.

With the above-mentioned configuration, with the contact portion extending from the front surface as with the grabbing portion, the user can easily hook the contact portion onto the holding portion in the state of grabbing the grabbing portion.

(G) In the liquid ejection apparatus described above, the grabbing portion and the contact portion may be integrally constructed.

With the above-mentioned configuration, the user can easily hook the contact portion onto the holding portion in the state of grabbing the grabbing portion.

(H) In the liquid ejection apparatus described above, the holding portion may be a metal frame making up the liquid ejection apparatus.

With the above-mentioned configuration, the risk of the deformation of the holding portion due to the weight of the cap is reduced.

(I) In the liquid ejection apparatus described above, the holding portion may hold the cap in a posture in which the cap faces upward.

With the above-mentioned configuration, in the state where the cap is held by the holding portion, the risk of liquid spillage from the cap is reduced.

What is claimed is:

1. A liquid ejection apparatus comprising:

an ejection portion including a nozzle surface at which one or more nozzles open, and configured to eject, from the nozzle, liquid in a direction different from a vertical direction;

a cap configured to form a space in communication with the nozzle by making contact with the ejection portion;

a mounting portion to which the cap is detachably mounted; and a holding portion configured to hold the cap in a detached state from the mounting portion, wherein the cap includes a grabbing portion configured to be grabbed by an operator, and a contact portion configured to be hooked onto the holding portion.

2. The liquid ejection apparatus according to claim 1, wherein the cap is detached from above with respect to the mounting portion, and the holding portion is located above the mounting portion.

3. The liquid ejection apparatus according to claim 1, wherein the grabbing portion is a first grabbing portion, and the cap includes a second grabbing portion at both ends of the cap, the second grabbing portion being configured to be grabbed by the operator.

4. The liquid ejection apparatus according to claim 3, wherein the ejection portion is a line head configured to eject liquid simultaneously over a width of a medium.

5. The liquid ejection apparatus according to claim 1, wherein the mounting portion includes a guide configured to define a detaching direction of the cap, and the grabbing portion extends from a front surface of the cap in the detaching direction.

6. The liquid ejection apparatus according to claim 5, wherein the contact portion extends from the front surface.

7. The liquid ejection apparatus according to claim 6, wherein the grabbing portion and the contact portion are integrally constructed.

8. The liquid ejection apparatus according to claim 1, wherein the holding portion is a metal frame making up the liquid ejection apparatus.

9. The liquid ejection apparatus according to claim 1, wherein the holding portion holds the cap in a posture in which the cap faces upward.

10. The liquid ejection apparatus according to claim 1, wherein the cap includes a cap member that contacts the nozzle surface, and the grabbing portion is provided at a position away from the cap member.

11. The liquid ejection apparatus according to claim 1, wherein the holding portion holds the cap in a posture in which the cap faces obliquely upward.

12. A liquid ejection apparatus comprising:

an ejection portion including a nozzle surface at which one or more nozzles open, and configured to eject, from the nozzle, liquid in a direction different from a vertical direction;

a cap configured to form a space in communication with the nozzle by making contact with the ejection portion;

a mounting portion to which the cap is detachably mounted; and a holding portion configured to hold the cap detached from the mounting portion, wherein the cap includes a grabbing portion configured to be grabbed by an operator, and a contact portion configured to be hooked onto the holding portion, and the grabbing portion and the contact portion are integrally constructed.

* * * * *